US009959716B2

(12) United States Patent
Macours et al.

(10) Patent No.: US 9,959,716 B2
(45) Date of Patent: May 1, 2018

(54) MULTI-TONE HAPTIC PATTERN GENERATOR

(71) Applicant: NXP B.V., Eindhoven (NL)

(72) Inventors: Christophe Marc Macours, Hodelge (BE); Shawn William Scarlett, Nijmegen (NL); Michael Joehren, San Jose, CA (US)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/599,262

(22) Filed: May 18, 2017

(65) Prior Publication Data

US 2017/0256145 A1 Sep. 7, 2017

Related U.S. Application Data

(63) Continuation-in-part of application No. 14/615,318, filed on Feb. 5, 2015, now Pat. No. 9,661,198.

(30) Foreign Application Priority Data

Feb. 13, 2014 (EP) ..................................... 14155075

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC ........ G06F 3/016; G06F 3/0362; G06F 3/017; G08B 6/00
See application file for complete search history.

(56) References Cited

U.S. PATENT DOCUMENTS

2004/0086140 A1 5/2004 Fedigan et al.
2012/0229264 A1* 9/2012 Company Bosch .... G06F 3/016
340/407.1

(Continued)

FOREIGN PATENT DOCUMENTS

EP 2 355 542 A1 8/2011
EP 2 538 699 A1 12/2012
WO 2009/010055 A1 1/2009

OTHER PUBLICATIONS

Klippel. W. "Loudspeaker Nonlinearities—Causes, Parameters, Symptoms", J. Audio Engineering Society, pp. 119 (Oct. 2005).

(Continued)

*Primary Examiner* — Kabir A Timory
(74) *Attorney, Agent, or Firm* — Rajeev Madnawat

(57) ABSTRACT

A system for producing a mechanical haptic pattern based on linear resonance actuator (LRA) signal is disclosed. The system includes an actuator displacement sensor, the actuator displacement sensor configured to apply an alternating measurement signal at a predetermined frequency to an actuator motor. The actuator displacement sensor configured to use a measure of a voltage across and a current through the actuator motor to determine its impedance at the predetermined frequency and determine an estimated displacement of the actuator motor using said impedance and a predetermined displacement-impedance function. The system also includes a controller configured to accept the LRA signal and the estimated displacement, wherein the controller is configured to alter the input LRA signal according to the estimated displacement to limit excursion of a moving part of the actuator motor.

11 Claims, 3 Drawing Sheets

(56) References Cited

U.S. PATENT DOCUMENTS

Figure 1:
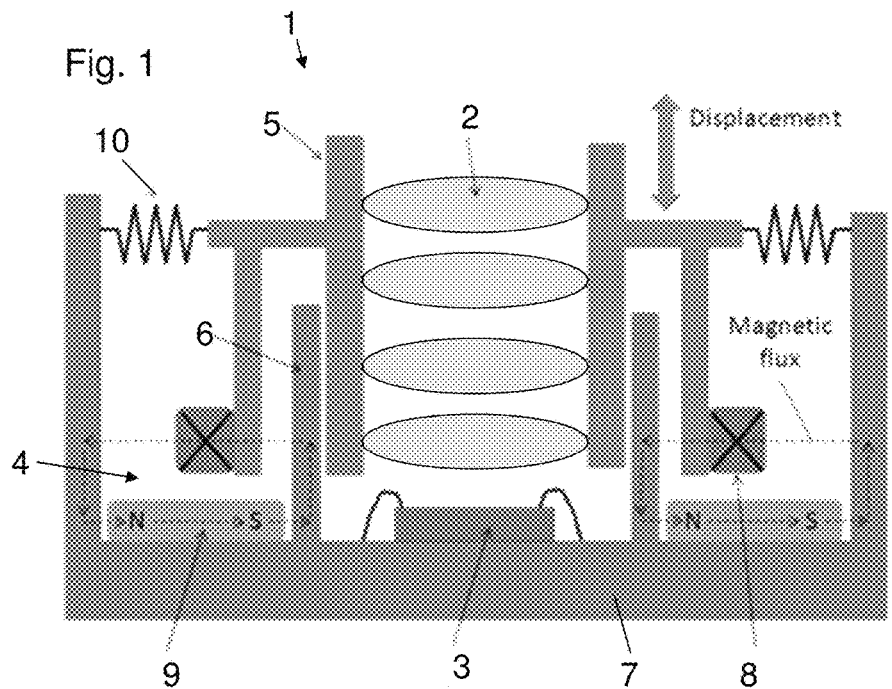

| | | |
|---|---|---|
| 2013/0077795 A1 | 3/2013 | Risbo et al. |
| 2013/0251164 A1 | 9/2013 | Gautama |
| 2013/0251167 A1 | 9/2013 | Gautama |
| 2014/0241536 A1 | 8/2014 | Adams et al. |
| 2015/0312679 A1 | 10/2015 | Little |

OTHER PUBLICATIONS

Dodd, M. et al. "Voice Coil Impedance as a Function of Frequency and Displacement", J. Audio Engineering Society, pp. 119 (Oct. 2004).

\* cited by examiner

MULTI-TONE HAPTIC PATTERN GENERATOR

This application claims priority as a continuation-in-part of co-pending application Ser. No. 14/615,318 filed on Feb. 5, 2015, which claims the priority under 35 U.S.C. § 119 of European patent application no. 14155075.6, filed on Feb. 13, 2014, the contents of which are incorporated by reference herein.

This invention relates to a voice coil motor displacement sensor and producing rich haptic patterns based on an input signal representing the haptic pattern. It also relates to a voice coil motor controller. It also relates to a lens focussing voice coil motor controller for a camera. Further, the invention relates to method of determining the displacement of a voice coil motor.

Many consumer electronics, such as mobile telephones, include camera functionality. Typically the camera includes an auto-focus (AF) capability. Auto focus requires precise motive control of a lens assembly to enable the camera to focus on a target object and provide a sharp image. It is common for AF systems to use Voice Coil Motors (VCM) to control the position of the lens assembly. VCMs are commonly used due to their small size, low cost and ease of implementation. It will be appreciated that VCMs also have application for positioning or actuating components in other electronic devices.

According to a first aspect of the invention we provide a voice coil motor displacement sensor, the sensor configured to apply an alternating measurement signal at a predetermined frequency to a voice coil motor, the sensor configured to use a measure of a voltage across and a current through the voice coil motor to determine its impedance at the predetermined frequency and determine an estimated displacement of said voice coil motor using said impedance and a predetermined displacement-impedance function.

This is advantageous as the displacement of the voice coil motor can be determined using an alternating measurement signal and a measure of the voltage and current parameters of the voice coil motor. Voice coil motors are typically driven by DC input signals and it has been found that application of an alternating measurement signal makes it possible to accurately determine the displacement of the motor without detrimentally affecting the operation of the motor. The sensor is therefore able to determine the impedance and, in particular, the inductance of the voice coil motor using the measurement signal and, using a predetermined function, determine an estimate of the motor's displacement.

The measurement signal may comprise a low amplitude (possibly in comparison to an input signal applied to the motor) and high frequency (above 2 kHz) signal that is applied to the voice coil motor or its driver circuit in addition to an input signal. The measurement signal provides an alternating signal for the sensor to measure in order to determine the impedance of the voice coil motor at a particular displacement.

Said measurement signal may comprise a tone of predetermined frequency. Said measurement signal may have a frequency outside of audible range. The measurement signal may have a frequency greater than 2 kHz. The measurement signal may have a frequency greater than four octaves above a resonance frequency of the voice coil motor. This is advantageous as a measurement signal of this frequency may avoid unwanted VCM motion. The resonance frequency of a VCM is, for example, typically in the range between 50 and 150 Hz. It will also be appreciated that the impedance-displacement relationship must be sufficiently present to be reliably measured in the frequency range chosen for the measurement signal.

The measurement signal may comprise a plurality of tones, each having a different frequency. The measurement signal may comprise noise introduced into the input signal over a particular frequency range.

According to a second aspect of the invention, we provide a voice coil motor controller for control of a voice coil motor of a camera, the controller including the voice coil motor displacement sensor of the first aspect of the invention and configured to control the displacement of the voice coil motor using the estimated displacement determined by the sensor.

This is advantageous as the motor controller can control the voice coil motor using a closed-loop feedback technique. This provides improved accuracy and speed of operation. As the motor controller only requires use of the sensor which measures the voltage across and the current through the voice coil motor to determine the estimated displacement, it can be cost-effective. The motor controller does not require input of other sensors, such as hall sensors or position sensors, as it is able to derive the estimated position from the voltage and current measurements alone using the sensor. It has been found that the control of the voice coil motor position can be advantageously improved by using the dependency of the voice coil motor inductance on its displacement derived from application of an alternating measurement signal. In operation, the voice coil motor will be mainly driven by DC or low frequency drive currents, and therefore characterisation of the displacement-impedance function for each voice coil motor position can be performed in advance and stored. The displacement-impedance function may comprise a look-up table of displacement vs voice coil impedance, which the controller may reference when it has determined the impedance. It will be appreciated that while the voice coil motor controller may be used for control of a voice coil motor of a camera, it may equally be used for other VCMs used to position components in other electronic devices.

The voice coil motor controller may be configured to apply an input signal to said voice coil motor to drive it to a target displacement. The input signal may comprise a DC input signal. Thus, the motor controller may initially determine a target displacement, such as from an auto-focus controller, which comprises an instruction to move the lens assembly associated with the voice coil motor to a particular position. This may be to bring an image into focus or for seeking a position of the lens assembly in which a resulting image is in focus.

The voice coil motor controller may be configured to combine the input signal with the alternating measurement signal of the sensor for supply to the voice coil motor. Thus, the determination by the sensor of the estimated displacement may occur during normal operation of the VCM.

The motor controller may be configured to receive a desired position, such as a desired lens assembly position from an auto-focus controller, said motor controller configured to determine an appropriate input signal to drive the voice coil motor to a target displacement corresponding to the desired position.

The motor controller may be configured to modify said input signal based on a difference between the target displacement and the estimated displacement. This is advantageous as the voice coil motor controller can use the sensor to determine how accurate the displacement of the voice coil motor was based on the initial input signal. If there is an offset from the target displacement, the input signal can be modified based on this feedback to move the voice coil motor so that it more accurately adopts the target displacement.

The motor controller may be configured to store the modification made to the input signal for subsequent determination of the input signal including said stored modification. Thus, the motor controller may include a table or function that associates target displacement and the input signal to apply to the voice coil motor or its driver circuit. Based on the feedback from the estimate displacement, the table or function may be modified. Thus, when the auto-focus controller next requests that the motor controller moves the voice coil motor to the particular target displacement, it can generate a more accurate input signal.

The motor controller may form part of an auto-focus controller. Thus, the motor controller may comprise a component part of an auto-focus controller for a camera configured to control the position of a lens assembly for focussing a camera.

According to a third aspect of the invention we provide method of determining a displacement of a voice coil motor, the method including the steps of;
   applying an alternating measurement signal at a predetermined frequency to the voice coil motor;
   measuring a voltage across and a current through the voice coil motor;
   determining an impedance of the voice coil motor using said voltage and current measurements;
   determining said displacement of the voice coil motor using said impedance and a predetermined displacement-impedance function.

This is advantageous as the displacement determined by the method is an estimate of the displacement of the voice coil motor which can be used for fault identification, control of the motor, diagnostics or other purposes.

The method may include the step of applying a DC input signal to the voice coil motor to drive it to a target position. The method may include the step of combining the DC input signal with the alternating measurement signal. The method may comprise a method of controlling a voice coil motor, such as a voice coil motor configured to position a lens assembly of a camera, the method comprising the step of controlling the displacement of the voice coil motor based in the determined displacement.

According to a fourth aspect of the invention we provide an integrated circuit (IC) including the voice coil motor displacement sensor of the first aspect or the voice coil motor controller of the second aspect or configured to perform the method of the third aspect.

According to a fifth aspect of the invention we provide an electronic device including the motor controller of the second aspect of the invention, the motor controller configured to control a voice coil motor associated with a lens assembly of a camera of said electronic device.

According to a sixth aspect of the invention, we provide a method of determining an impedance-displacement function for a voice coil motor, the method comprising;
   i) applying an input signal to drive the voice coil motor to a particular displacement;
   ii) applying an alternating measurement signal to the voice coil motor in addition to the input signal;
   iii) measuring a voltage across and a current through the voice coil motor;
   iv) determining an impedance of the voice coil motor using said voltage and current measurements;
   v) measuring the actual displacement of the voice coil motor;
   vi) associating the determined impedance and the actual displacement;
   vii) repeating steps ii to vi with a different input signal.

According to yet another embodiment, a system for producing a mechanical haptic pattern based on linear resonance actuator (LRA) signal is disclosed. The system includes an actuator displacement sensor, the actuator displacement sensor configured to apply an alternating measurement signal at a predetermined frequency to an actuator motor. The actuator displacement sensor configured to use a measure of a voltage across and a current through the actuator motor to determine its impedance at the predetermined frequency and determine an estimated displacement of the actuator motor using said impedance and a predetermined displacement-impedance function. The system also includes a controller configured to accept the LRA signal and the estimated displacement, wherein the controller is configured to alter the input LRA signal according to the estimated displacement to limit excursion of a moving part of the actuator motor.

In some examples, the alternating measurement signal has a predetermined frequency outside of audible range and the measurement signal has a frequency greater than 2 kHz. The LRA signal includes a plurality of tones, each having a different frequency. The measurement signal may include noise over a particular frequency range.

The LRA signal is generated by a mobile phone to provide a haptic feedback to a user of the mobile phone and the LRA signal includes representations of vibration patterns associated with a plurality of user notifications. A circuit or driver is included to apply an input signal to the actuator motor to drive the moving part to a target displacement. The driver is configured to combine the input signal with the alternating measurement signal of the actuator displacement sensor. The driver may be further configured to receive a desired position and to determine a value of the input signal to drive the actuator motor to a target displacement corresponding to the desired position. In some examples, the driver is configured to modify the input signal based on a difference between the target displacement and the estimated displacement. In some examples, the controller is configured to store the modification made to the input signal for subsequent determination of the input signal from a desired target displacement including said stored modification.

Figure 2:
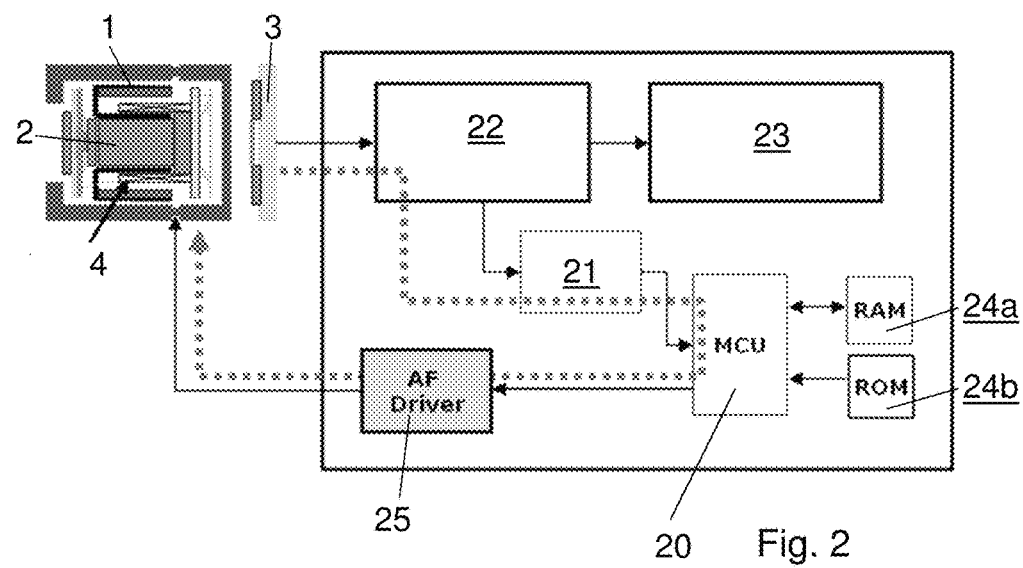
Figure 3:
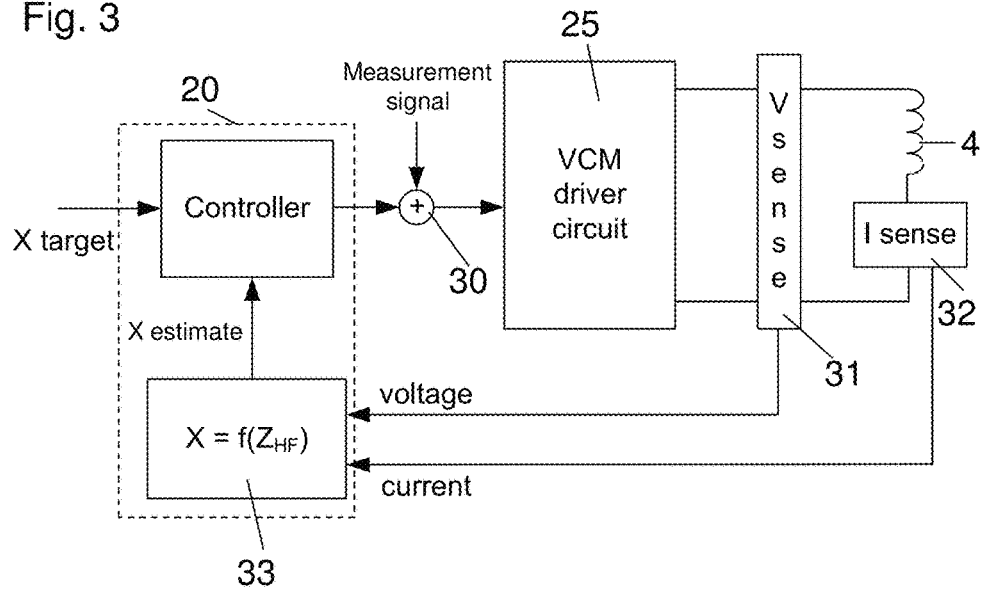
Figure 4:
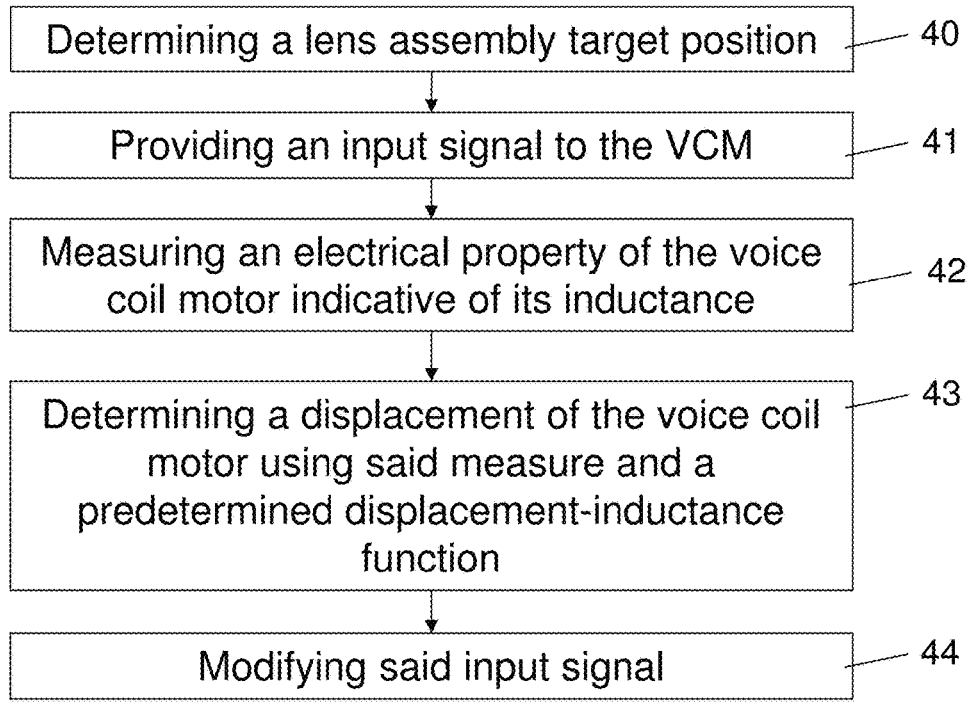
Figure 5:
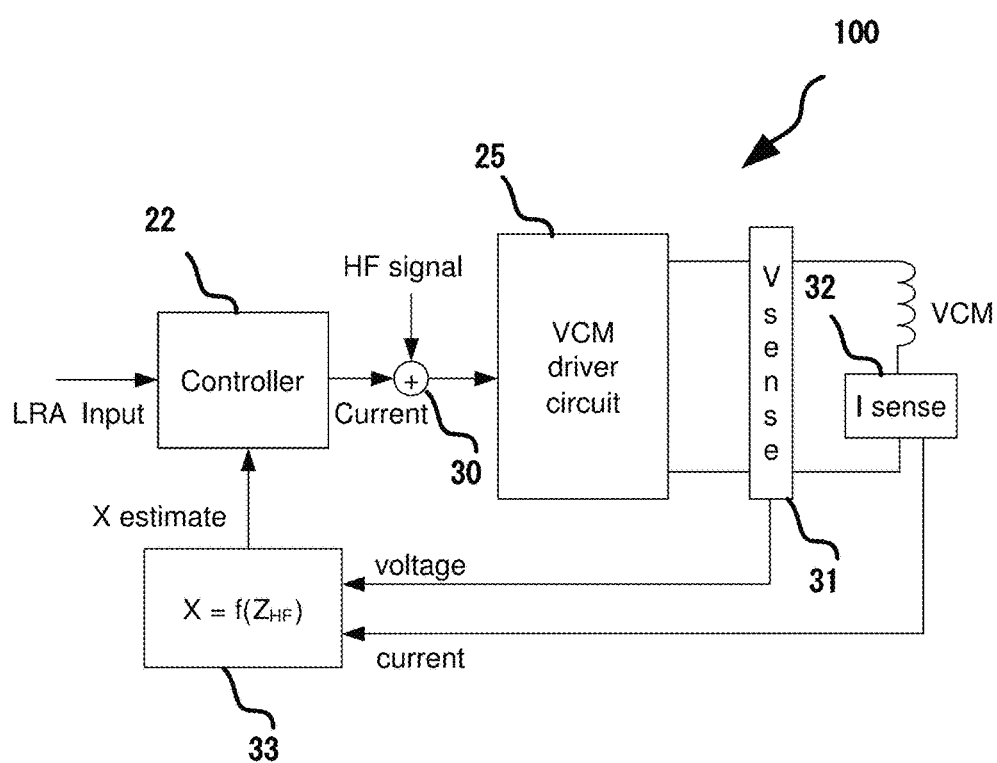

There now follows, by way of example only, a detailed description of embodiments of the invention with reference to the following figures, in which:
   FIG. 1 shows a camera element having a lens assembly connected to a voice coil motor;
   FIG. 2 shows a motor controller associated with an auto-focus controller;
   FIG. 3 shows an example motor controller;
   FIG. 4 shows a flow chart illustrating a method of determining the displacement of a lens assembly; and
   FIG. 5 shows a motor controller in accordance with one or more embodiments of the present disclosure.

FIG. 1 shows a camera element 1 having a lens assembly 2 comprising a plurality of lenses. The position of the lens assembly 2 relative to an image sensor 3 is controlled by a voice coil motor 4. In particular, the lens assembly 2 is mounted within a turret 5 which is slidably mounted within a barrel 6. The barrel 6 extends from a housing 7, which includes the image sensor 3. The voice coil motor 4 includes a motive part 8, which in this example comprises an electromagnet, and a stationary part 9, which in this example comprises a permanent magnet, as is conventional. Application of an input signal to the electromagnet generates a magnetic field. The voice coil motor provides a motive force to the turret by current flowing through it providing a reaction in the presence of a magnetic field from the permanent magnet 9. The turret 5 is held in a default position relative to the barrel 6 by a spring assembly 10. The voice coil motor 4 thus provides a motive force against the force of the spring assembly 10 to displace the lens assembly 2 from its default position.

FIG. 2 shows a voice coil motor controller 20, which includes a voice coil motor displacement sensor, and an auto-focus controller 21, which provide for control of the voice coil motor 4 of the camera element 1. It will be appreciated that while the sensor and controller are integrated in this embodiment, they may be provided as separate components. The motor controller 20 is shown in more detail in FIG. 3. The auto-focus controller 21 receives image data from an image processing element 22. The image processing element 22 receives input from the image sensor 3 to construct an image as captured by the image sensor 3 with the lens assembly in its current position. The image processing element 22 may be operatively connected to an image enhancement element 23, which provides for enhancement of the image. The auto-focus controller 21 interprets the image data to determine whether or not the image is in focus and therefore whether movement of the lens assembly 2 is required. The auto-focus controller 21 may use any known algorithm to perform this action. If movement of the lens assembly 2 is required, the auto-focus controller 21 provides a target displacement to the motor controller 20.

The motor controller 20 is embodied as a microcontroller, which is associated with memory 24a and 24b. The motor controller 20 provides a motor position signal to a voice coil driver 25 which uses the motor position signal to provide an appropriate driving signal to the voice coil motor 4 to displace the lens assembly 2 to the desired position (i.e. a displacement from its default position).

With reference to FIG. 3, the controller 20 receives the target displacement, labelled "X target", from the auto-focus controller (not shown in FIG. 3). The controller 20 provides an appropriate motor position signal, which may be predetermined, which should cause the voice coil motor to move the lens assembly to the desired target displacement. The motor position signal is received by a mixer 30, which combines the motor position signal with a measurement signal. The measurement signal is used by the controller 20 to determine the position of the voice coil motor 4. In this example, the measurement signal comprises a signal having a frequency outside audible range, such as 25 kHz. The measurement signal does not interfere with the position to which the motor position signal is intended to move the voice coil motor 4. The measurement signal may be generated by the controller or the sensor that forms part of the controller. The combined motor position signal and measurement signal is received by the voice coil motor driver 25, which provides a drive signal of appropriate voltage/current to drive the voice coil motor 4. Due to manufacturing tolerances and other factors the actual position that the voice coil motor 4 is driven to in response to the motor position signal may deviate from the target position.

The displacement sensor of the controller 20 is configured to receive a measure of the voltage applied across the voice coil motor 4 from a voltage sensor 31. It will be appreciated that the output of the driver 25 may be measured to determine the voltage. Further, the displacement sensor of the controller 20 is configured to receive a measure of the current through the voice coil motor 4 from a current sensor 32.

The displacement sensor of the controller 20 is configured to use the voltage and current from the sensors 31, 32 to determine an impedance of the voice coil motor 4 at the frequency of the measurement signal. Thus, the measurement signal provides a voltage and current in a frequency range where the impedance-displacement relationship is present for the sensors 31, 32 to measure. It will be appreciated that the sensors 31, 32 may be configured to measure the voltage and current at the measurement signal frequency.

The displacement sensor of the controller 20 used a predetermined relationship between the voice coil impedance (in particular the inductance) and the position of the voice coil motor 4. Thus, the controller 20 receives the impedance-displacement function 33 from the memory 24b. The controller 20 determines a displacement estimate, X, of the actual displacement from a function of the impedance, Z, at the measurement signal frequency, HF, which is shown in FIG. 3 as $X=f(Z_{HF})$. The controller 20 is configured to compare the actual displacement, X estimate, with the target displacement, X target. In response to any offset between the estimated displacement and the target displacement, the controller may adjust the motor position signal so that the estimated position more closely aligns with the target position requested by the auto-focus controller 21. The magnitude of the offset may determine the amount by which the motor position signal is adjusted. Accordingly, the controller 20 utilises a closed-loop feedback arrangement and only a measure of the voltage and current electrical properties of the voice coil motor 4 to provide quick and accurate control of a voice coil motor and therefore a lens assembly position for an auto-focus function.

The controller 20 may record the adjustments made to the motor position signal for each target displacement to improve the accuracy of the lens positioning during use. The modifications may be stored in memory 24a.

FIG. 4 shows a flowchart illustrating the auto-focus function with the improved positioning provided by the motor controller 20. Step 40 shows the auto-focus controller 21 determining a lens assembly target position. Step 41 shows the controller 20 using the target position to determine an appropriate motor position signal for the voice coil driver. Step 42 shows the step of the controller 20 measuring an electrical property of the voice coil motor indicative of its impedance, i.e. the voltage across and current through the voice coil motor. Step 43 shows the controller 20 determining a displacement of the voice coil motor using said measures and a predetermined displacement-impedance function 33. Step 44 then shows the controller modifying the motor position signal, if required, based on an offset between the target position and the estimated displacement determined in step 43.

In other embodiments, the measurement signal may comprise a sinusoidal signal of a predetermined frequency or a plurality of signals. The measurement signal may comprise a noise signal over a predetermined frequency range centred on a predetermined frequency. It will be appreciated that while we disclose the application of the motor controller to an auto-focus system of a camera, the motor controller can be used in any system that utilises a voice coil motor. Further, although the embodiment shows a voice coil motor controller in combination with the displacement sensor, it will be appreciated that the displacement sensor may be distinct from the controller and may provide an estimated displacement for purposes other than control of the motor.

For example, the displacement sensor may be used for determining the displacement following application of an input signal to identify faults in the voice coil motor or its controller.

Many mobile devices make use of haptic motors for generating vibration alerts or more complex haptic patterns to enhance man-device interaction. Newer mobile devices typically make use of AC-driven Linear Resonant Actuators (LRAs) in favour of DC-driven Eccentric Rotating Mass (ERM) motors because LRAs are capable of producing more complex haptic effects.

LRAs have a similar principle of operation as electrodynamic loudspeakers. A magnetic field is generated by the voice coil which interacts with the magnet and mass, which are suspended on a spring. As the magnetic field varies with the applied drive signal, the magnet and mass are moved up and down as they interact with the spring. The moving mass generates vibrations, as opposed to loudspeaker where a moving cone (or membrane) is generating sound pressure waves.

The interaction between the LRA spring and mass result in a resonant behaviour. The resonant frequency typically is in the range between 150 Hz and 250 Hz, the latter being the peak human skin sensitivity frequency. The perceived haptic force is dependent on the drive signal level, which is usually a sinewave at the resonant frequency.

The nominal LRA drive voltage (typically around 2 Vrms) is usually defined in specified test conditions which account for worst case situations such as high ambient temperature. In normal conditions, the nominal drive voltage can be exceeded provided the LRA states are monitored and a protection mechanism guarantees a safe operation without lifetime reduction. In some situations, exceeding the nominal drive voltage may be needed desirable in order to maximize the haptic force generated by a given motor.

A typical LRA is designed to operate at a single drive frequency, which should be the mechanical resonant frequency, where LRA efficiency (Newton/Watt) is the highest. Several applications require the LRA to generate a broader range of frequencies, for example to generate more complex haptic patterns, to generate bass tones in accordance with the music being reproduced on a loudspeaker, or, more recently, to generate short haptic impulses to simulate virtual buttons such as in newer phone devices from Apple™. These new use-cases require a significantly higher drive voltage, because of the low efficiency of the LRA outside its resonant frequency.

Application Ser. No. 15/372,809 filed on Dec. 8, 2016 by the same inventor as the present application and entitled "Optimal Linear Resonant Actuator (LRA) drive", which is being incorporated herein by reference, discloses a system and method for optimally driving a Linear Resonant Actuator (LRA) by maximizing the drive signal up to the LRA mechanical and thermal limits without lifetime reduction. The above noted application also discloses means for extending the reproduction bandwidth so as to allow the safe reproduction of a plurality of frequency components.

In order to optimally drive an LRA, a sufficiently accurate estimate of the mechanical displacement of the moving parts is needed. As described above, this displacement can be estimated by tracking the variations of the electrical impedance at high frequencies.

FIG. 5 shows a schematic of a system 100 for producing haptic patterns. The system 100 is a modified version of the system shown in FIG. 3. The controller 22 is modified to accept LRA input that is a time-varying signal corresponding to the haptic waveform to be reproduced. Based on the estimated displacement, the controller 22 can reduce the power of the LRA input in such a way that the LRA displacement is not exceeding a pre-defined value, so as to avoid lifetime reduction of the LRA component, or to prevent unwanted vibrations or noise components resulting from an excessive displacement.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A system for producing a mechanical haptic pattern based on linear resonance actuator (LRA) signal, the system comprising:

an actuator displacement sensor, the actuator displacement sensor configured to apply an alternating measurement signal at a predetermined frequency to an actuator motor, the actuator displacement sensor configured to use a measure of a voltage across and a current through the actuator motor to determine its impedance at the predetermined frequency and determine an estimated displacement of the actuator motor using said impedance and a predetermined displacement-impedance function;

a controller configured to accept the LRA signal and the estimated displacement, wherein the controller is configured to alter the LRA signal according to the estimated displacement to limit excursion of a moving part of the actuator motor.

2. The system of claim 1, wherein said alternating measurement signal has a predetermined frequency outside of audible range.

3. The system of claim 1, wherein the measurement signal has a frequency greater than 2 kHz.

4. The system of claim 1, wherein the LRA signal includes a plurality of tones, each having a different frequency.

5. The system of claim 1, wherein the measurement signal comprises noise over a particular frequency range.

6. The system of claim 1, wherein the LRA signal is generated by a mobile phone to provide a haptic feedback to a user of the mobile phone, wherein the LRA signal includes representations of vibration patterns associated with a plurality of user notifications.

7. The system of claim 1, further including a driver to apply an input signal to the actuator motor to drive the moving part to a target displacement.

8. The system of claim 7, wherein the driver is configured to combine the input signal with the alternating measurement signal of the actuator displacement sensor.

9. The system of claim 7, wherein the driver is configured to receive a desired position and to determine a value of the input signal to drive the actuator motor to a target displacement corresponding to the desired position.

10. The system of claim 9, wherein the driver is configured to modify the input signal based on a difference between the target displacement and the estimated displacement.

11. The system of claim 10, wherein the controller is configured to store the modification made to the input signal for subsequent determination of the input signal from a desired target displacement including said stored modification.

* * * * *